(12) United States Patent
Law et al.

(10) Patent No.: US 6,330,602 B1
(45) Date of Patent: *Dec. 11, 2001

(54) SCALEABLE WEB SERVER AND METHOD OF EFFICIENTLY MANAGING MULTIPLE SERVERS

(75) Inventors: Eddie Ka Lun Law, North York; Biswajit Nandy, Ottawa; Alan S.J. Chapman, Kanata, all of (CA)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,929

(22) Filed: Nov. 7, 1997

(30) Foreign Application Priority Data

Apr. 14, 1997 (CA) .................................................. 2202572

(51) Int. Cl.[7] ..................................................... G06F 15/16
(52) U.S. Cl. .......................... 709/224; 709/217; 709/226; 709/249; 709/203; 370/428; 370/401
(58) Field of Search .................................... 709/217, 218, 709/219, 226, 203, 228, 227, 229, 249, 252, 224; 370/428, 429, 401–409

(56) References Cited

U.S. PATENT DOCUMENTS

| 5,748,897 | * | 5/1998 | Katiyar | 395/200.49 |
|---|---|---|---|---|
| 5,761,507 | * | 6/1998 | Govett | 395/684 |
| 5,774,660 | * | 6/1998 | Brendel et al. | 395/200.31 |
| 5,774,668 | * | 6/1998 | Choquier et al. | 395/200.53 |
| 5,848,233 | * | 12/1998 | Radia et al. | 395/187.01 |
| 5,850,517 | * | 12/1998 | Verkler et al. | 395/200.32 |
| 5,903,559 | * | 5/1999 | Acharya et al. | 370/355 |
| 5,933,606 | * | 8/1999 | Mayhew . | |
| 5,951,694 | * | 9/1999 | Choquier et al. | 714/15 |
| 5,963,944 | * | 10/1999 | Adams . | |
| 6,006,264 | * | 12/1999 | Colby et al. | 709/226 |
| 6,047,323 | * | 4/2000 | Krause | 709/227 |
| 6,052,718 | * | 4/2000 | Gifford | 709/219 |
| 6,070,191 | * | 5/2000 | Narendran et al. | 709/226 |
| 6,078,943 | * | 6/2000 | Yu . | |
| 6,092,178 | * | 7/2000 | Jindal et al. . | |
| 6,094,680 | * | 7/2000 | Hokanson . | |
| 6,097,882 | * | 8/2000 | Mogul . | |
| 6,108,703 | * | 8/2000 | Leighton et al. | 709/226 |

* cited by examiner

Primary Examiner—Robert B. Harrell
Assistant Examiner—Stephan Willett (57) ABSTRACT

A client-server architecture includes a plurality of clients and a plurality of servers. Information resources are replicated among the servers. According to one aspect, the invention includes an intermediary device called a "depot" sitting transparently between a client and a pool of servers which have the replicated information resources. The depot dynamically distributes multiple sessions contained in a client request among the servers. This architecture realizes a good granular scaleability of servers, and improved server throughput with a good response time. Multiple depots also realize robustness.

20 Claims, 4 Drawing Sheets

SCALEABLE WEB SERVER AND METHOD OF EFFICIENTLY MANAGING MULTIPLE SERVERS

FIELD OF THE INVENTION

The invention relates generally to distributed server systems which are used widely in the field of telecommunications for information sharing. In particular, it is directed to a distributed server system which is scaleable and realizes high server performances. The distributed server system of the invention includes an intermediary node between a client and a pool of servers.

BACKGROUND OF THE INVENTION

The last few years have observed a phenomenal growth in web (short for World-Wide Web or WWW, or Internet) usage. This growth has demonstrated the value of wide-area information-sharing but, at the same time, caused a significant research interest in improving the performance of web systems. Recent studies show that the web consumes more Internet bandwidth than any other application.

At a macro level, a web system consists of three components: (i) client, (ii) communication protocol, and (iii) server. Efforts are being made at each component to enhance the performance of the overall web systems.

At the client end, supports are provided to improve response time by the following features: memory cache, disk cache, allowing multiple simultaneous sessions and introducing a proxy server for another level of caching.

The communication protocol between the client and the server is HTTP (Hypertext Transfer Protocol) which always assumes the existence of a reliable path layer underneath the client and server. TCP/IP (Transmission Control Protocol/Internet Protocol) provides reliable data transmission using window flow control techniques. HTTP therefore runs on top of the TCP/IP layer. Asynchronous Transfer Mode (ATM) is another transmission technique to handle broadband multimedia traffic. It continues to grow steadily in the communication world. High-speed ATM switches are available in the commercial market. The co-existence of the Internet and large-scale ATM networks is expected in the near future. ATM can provide wide-area virtual circuits, thus facilitating geographical distribution of web servers.

The HTTP has also undergone changes for performance improvement. It has been reported that multiple TCP sessions per HTTP transaction is a major cause of performance bottleneck. The introduction of a "keep alive" header allows sessions to be kept open and used for multiple HTTP request/response activities.

The web servers have also undergone improvements: first-generation servers handled 20 transactions/sec. based on one process per transaction. The major overhead was due to a large process fork time for a new transaction. This was avoided by pre-forking multiple processes and using a dispatcher to distribute transactions among them to achieve server performance of 100 transactions/sec. The "keep alive" HTTP feature, along with the multi-threaded architecture of only one process, allows the server to handle more than 250 transactions/sec. However, the current trend indicates that the popular sites will incur a significantly higher number of server transactions per second in the near future. This requires more powerful web servers which may be developed by improving different components of a web server (e.g., CPU speed, disk performance, file system performance, performance of TCP/IP, server software architecture etc.). Alternatively, multiple servers can be used to handle high rate of server transactions.

The multiple server approach has two immediate advantages: if a server fails, the session can be handled from other servers; also the total cost of multiple servers can be less than the cost of one server with the equivalent performance. It is therefore foreseen that multiple server systems will be in great demand to accommodate an ever-increasing number of user transactions.

Figure 1:
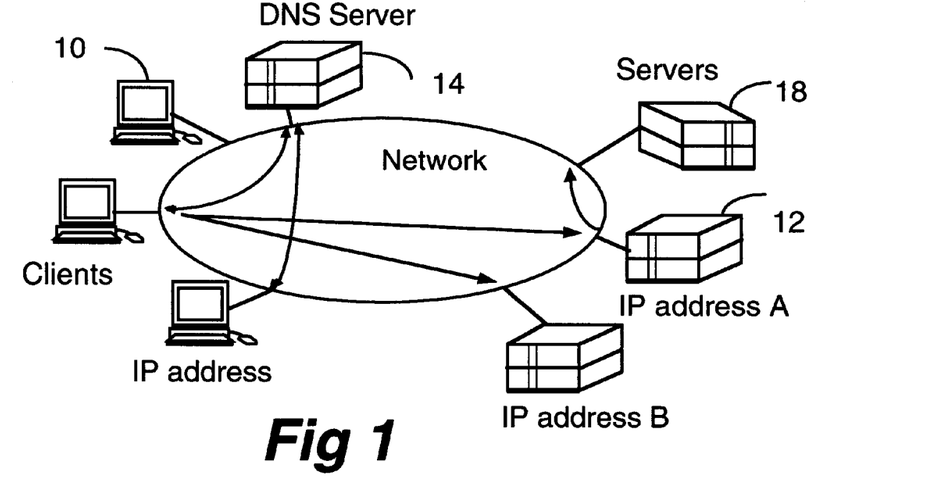
FIG. 1 shows multiple server systems of known architecture.

Different architectures for multiple server systems are currently in use and are described briefly here. The use of a Domain Name System (DNS) server to distribute traffic among multiple servers was investigated at NCSA at the University of Illinois. FIG. 1 shows the DNS system. When a client 10 wishes to communicate with a server 12, at first it contacts the DNS 14, from which it obtains the IP address of the desired server. The client then uses this IP address to communicate with the server. All clients perform the same process unless they already have the IP addresses of servers with which they want to connect. When there are a plurality of servers which hold identical information, the DNS rotates in a round robin manner through a pool of these identical servers which are alternatively mapped to the alias of the hostname of one server. This approach has provided some success in distributing the server load, however, it could not balance the load among servers. Another problem with this approach is that, once the IP address resolution is cached in the local memory, the client may never contact DNS.

Another system uses the HTTP level redirection capability to move a transaction among multiple servers. FIG. 1 also shows this mechanism. When a server 12 finds that it is impossible to handle any extra traffic, it can redirect a transaction to another preselected server 18 and hence distribute the load. HTTP redirection is a common technique used for WWW load distribution. The implementation maybe simple and straightforward, but the redirection requires a round trip delay between the client and server before the transaction is redirected to a different server. Moreover, if the first server is already very busy, the response delay will be even greater.

Figure 2:
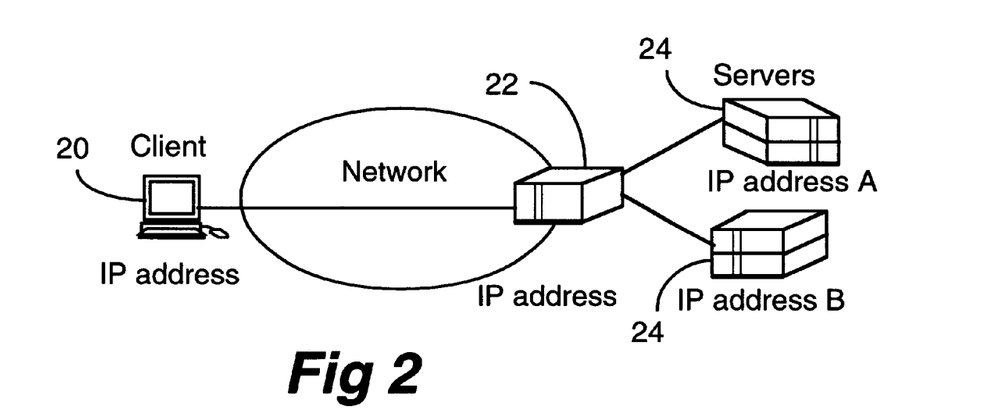
FIG. 2 shows another multiple server system of known architecture.

FIG. 2 shows another known system which switches the load based on the client IP address. Each client 20 goes to an intermediate device 22 which examines the originating IP address and decides where to forward the traffic among multiple servers 24. IP address hashing is one of the possible mechanisms to determine the server to which the traffic will be directed. This technique, however, lacks the dynamic control of user accesses. Moreover, the IP address spaces are partitioned into five different classes. Care should fherefore be taken in designing good hashing function.

HTTP is a stateless protocol. A web server obtains everything it needs to know about a request from the HTTP request itself. After the request is serviced, the server can forget the transaction. Thus, each request in HTTP is disjointed. If all the servers are identical (or see the same file system using a distributed file system), the server from which the request is served is of little relevance to the client. The choice of a physical server itself is immaterial to the transactions. An HTTP transaction is an aggregation of one or more TCP sessions. Based on this principle, different TCP sessions can be allocated to different servers without the knowledge of whether or not all the TCP sessions belong to the same HTTP transaction. The present invention realizes this TCP-based switching by the use of an intermediary entity called a depot to perform these functions of session allocation. Thus, the TCP-based server switching allows a nice granularity for load balancing among multiple servers. It is also envisaged that this concept of forwarding different sessions to different servers can be applied to similar multi-server architectures of telecommunications networks.

OBJECTS OF THE INVENTION

It is an object of the invention to provide a server system which has a high performance.

It is another object of the invention to provide a communications architecture which allows the construction of a scaleable and high performance server system.

It is a further object of the invention to provide a method of and an apparatus for efficiently managing the resources of a multiple server system.

It is still another object of the invention to provide a method of and an apparatus for efficiently managing the resources of a multiple server system by the use of an intermediate entity.

It is yet a further object of the invention to provide a method of and an apparatus for efficiently managing the resources of a multiple server system by the use of more than one instance of the intermediate entity for improved robustness.

SUMMARY OF THE INVENTION

Briefly stated, the invention resides in a client-server environment of a telecommunications network, where information resources are replicated among a plurality of servers and a plurality of clients have access to any one or more of the servers for desired information resources. According to one aspect, the invention is directed to a method of efficiently utilizing the plurality of servers. The method comprises steps of performing a transaction between one of the plurality of clients and the plurality of servers by way of an intermediary function called a depot, each transaction comprising one or more information transfer sessions, switching at the depot the plurality of sessions among the plurality of servers so that during each session transfer of the information resources is performed between one client server pair.

According to another aspect, the invention resides in a client-server environment of a telecommunications network, where information resources are replicated among a plurality of servers and a plurality of clients have access to any one or more of the servers for desired information resources through transactions using at least two layers of protocols, one stateless protocol layer upon another stateful protocol layer. The invention is therefore directed to a method of efficiently utilizing the plurality of servers during the transactions. The method comprises a step of performing each transaction between one of the plurality of clients and the plurality of servers by way of a depot, each transaction comprising one or more information transfer sessions. The invention further includes the following steps performed at the depot: inspecting all packets of each information transfer session, forwarding packets of existing information transfer sessions to a correct server, detecting packets of a new information transfer session, selecting a server among the plurality of servers, and forwarding all the packets of the new information transfer session to the selected server so that during each of the existing and new information transfer session transfer of the information resources is performed between each of a plurality of client-server pairs.

In accordance with another aspect, the invention is directed to a depot for transferring one or more information transfer sessions between a client and among a plurality of servers. The depot comprises a packet analysis block for analysing and forwarding packets of one or more information transfer sessions between a client and one of the servers and a session management block for switching one or more information transfer sessions among a plurality of servers according to a preset criteria including the states of each information transfer session. The depot further includes a protocol state tracking block for monitoring the states of the sessions.

DETAILED DESCRIPTION OF PREFERRED EMBODIMENTS OF THE INVENTION

Figure 3:
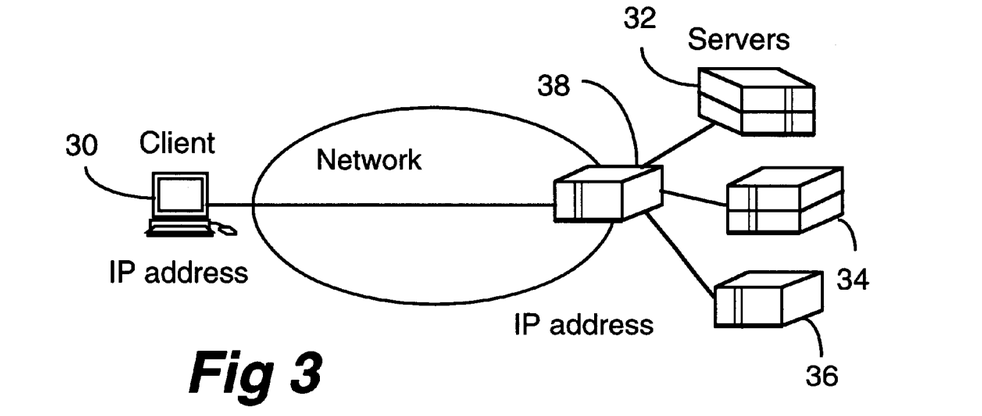
FIG. 3 shows schematically a client-server server system according to one embodiment of the invention.

FIG. 3 shows schematically the invention according to one embodiment. A client 30 is communicating with a server 32 through a telecommunications network which can be any transport network such as telephone networks, data networks, ATM networks, LANs, or a combination thereof. WWW or Internet runs on top of the transport network. Typically, a client sends the server 32 a request for information stored therein and the server replies with the desired information. The desired information, however, may require more than one session (e.g., TCP session). In the multiple server environment, servers 34 and 36 contain identically stored information as that stored in server 32. According to the one embodiment of invention, an intermediate entity 38 sits transparently between the client and the servers. The intermediate entity 38 is called a "depot" throughout this specification and is the heart of the invention. When the depot receives a request for information, it distributes the TCP sessions among multiple servers based on the server load balancing criteria. In actual implementation, the depot can be realized by the use of appropriate software, hardware or a combination of the both. It should also be noted that the concept of session distribution among the servers can be implemented in other multiserver environments which use protocol stacks of similar configurations.

The depot is a forwarding mechanism and forwards any particular packet to the assigned server using a map. All clients access the server system using the depot's IP address. The distribution of TCP sessions among multiple servers by the depot remains transparent to the client. A TCP session consists of multiple TCP packets. All TCP packets of a given TCP session are served by the same server. Since the forwarding of all TCP packets of a given TCP session must go to the same server, a map between the IP address and port number of the client and the identity of the server is maintained. The entry of this map is to be maintained in the depot as long as required by the TCP protocol. This entry is preserved in the depot as long as there is a possibility of the arrival of a TCP packet from a client or a server. The depot does not generate any TCP packets nor does it discard any unless they are anomalous enough that there is no way to assign them to a server.

A depot has the following functions:
1. inspect all packets in both directions at IP and TCP levels;
2. choose a server based on load balancing criteria for a new TCP session;
3. forward TCP packets for existing sessions to the already chosen server;
4. forward TCP packets from servers to clients;
5. clean up the mapping entry when TCP sessions end; and
6. watch for and handle anomalous TCP packets.

Figure 4:
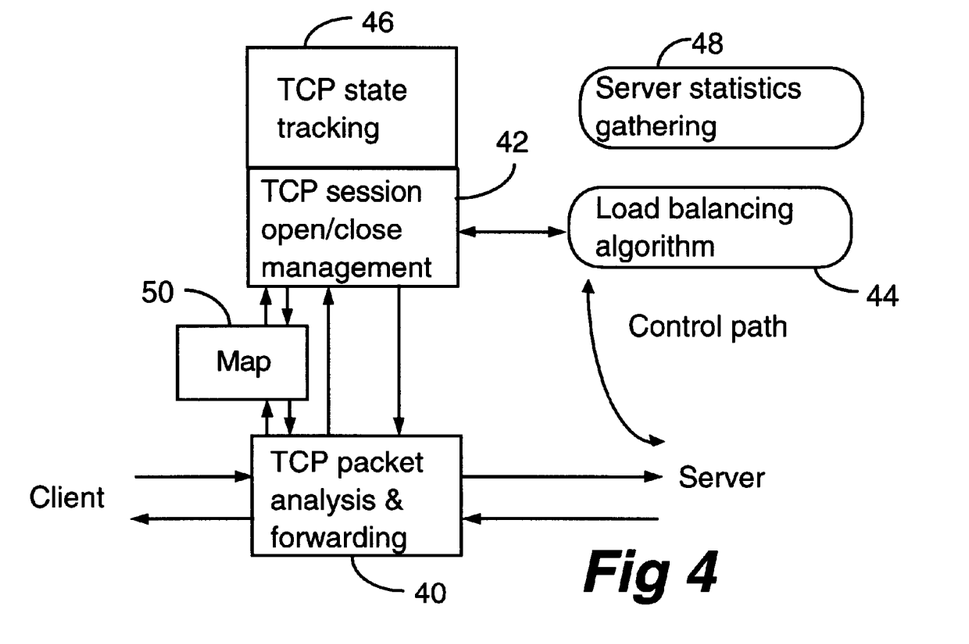
FIG. 4 is a functional block diagram of an intermediary device according to one embodiment of the invention.

All these functions are performed in a depot and FIG. 4 shows its functional block diagram. Referring to FIG. 4, the depot includes TCP packet forwarding block 40 for TCP packet analysis and forwarding. This block inspects all packets in both directions at IP and TCP levels, forwards TCP packets of existing sessions to the already chosen server, and forwards TCP packets from servers to the clients. For a new session, this block identifies the TCP session setup request and forwards information to session management block 42. The session management block 42 chooses a server among a pool of available servers. This block is preloaded with the next server to be allocated. This pre-load is done by running a load balancing algorithm such as shown at 44 in the figure on the basis of knowledge of the server statistics and perhaps network states, or simply by round-robin. Server probing 48 can be performed periodically to obtain the server statistics. The TCP packets carrying data are forwarded by the TCP packet forwarding block 40 by identifying the entry of a map between the server and the client. At TCP state tracking block 46, TCP states of both the clients and the servers are being monitored to facilitate the management of the TCP session, e.g., opening/closing and control functions.

The depot maintains the map 50 of all the active TCP sessions in a table called the primary table. Each session between a client and a server is identified by the combination of the client's IP address and port number.

A typical primary table entry has the following: client IP address and port number, server identity, TCP states and related parameters (ack number, seq number etc.). The depot maintains another list of sessions in a table called the secondary table. The entries of the primary table are deleted at the close of sessions under normal or anomalous conditions. The secondary table entries are maintained for a 2 MSL (maximum segment lifetime) period. The duration of a 2 MSL differs for different implementations but, in this embodiment, a period of 2 minutes is chosen as an example. The 2 MSL is important since a TCP packet may arrive after a session is closed, due to variable delay at the network.

The reason for maintaining two separate tables at the depot is to reduce the search space for finding a match on arrival of a TCP packet. The number of entries in the secondary table is very large since the entries are maintained for a 2 MSL period. The entries in the primary table are for active TCP sessions only. Most of the incoming TCP packets should find a match in the primary table.

A TCP session is stateful within each session between a client and a server. Therefore, the depot should handle all arriving TCP/IP packets as transparently as possible; otherwise, the introduction of an intermediary such as the depot may disrupt the normal TCP logic between the two end systems. The crucial function of the state tracking routine in the depot involves the creation and deletion of the table entries. Several types of TCP/IP packets can initiate the creation and deletion of table entries. In the TCP state transition diagram, there are eleven states. For the client-server model, however, the number of possible states is reduced. This reduces the state tracking requirement in the depot. However, out-of-sequence situations can occur in the Internet, and different permutations of state transitions can arise which slightly increase the complexity of the state tracking routine. Moreover, in wide-area networks, packet loss is possible. Therefore, any packet received by the depot does not guarantee the reception of the packet by the other end. As a result, according to the invention, packets in both directions are analysed in order to get a complete view of the state of the session and the state tracking function of the depot simply guesses the current TCP states of the client and server by investigating the "flag" information of all arriving TCP packets. The states guessed at the depot may be different from the actual states at the client and server, if a TCP packet is dropped or corrupted in the network between the depot and the client or server.

The following is a detailed description of the handling of various TCP packets according to one embodiment of the invention.

SYN

A SYN packet header (client IP address and port) is matched with the entries in the primary table and then with the secondary table. If no match is found (i.e., arrival of a new session), a new entry is created in the primary table and based on the load balancing criterion, a server is allocated for the session. If a match is found (i.e., duplicate SYN), the packet is forwarded to an already allocated server.

FIN, PSH, URG

The match is found from the primary or secondary table and forwarded to the appropriate server. If no match is found, the packet is dropped.

ACK

All ACK packets are forwarded to the server if an entry is found in the table. If the ACK packet causes the state transition to the TIME_WAIT state, the entry is moved from the primary table to the secondary table for a 2 MSL time-out.

RST

All reset packets are validated by checking if the sequence number is in the window. If the state is SYN-SENT, the RST is considered valid if the ACK field acknowledges the SYN. If the RST is valid, the entry from the primary table is moved to the secondary table.

The exception conditions are handled in the following manner.

If an entry in the primary table is inactive for a long time (e.g., more than 20 mins.), the entry is moved to the secondary table. This is necessary since a client or server may crash without proper termination of a TCP session, causing an entry to the primary table to remain forever.

If an entry in the tables (primary and secondary) is not found on arrival of a packet other than SYN, the packet is dropped. This is necessary since the depot does not know the destination for the packet.

The depot does not cause any interruption of the ongoing TCP sessions between the clients and the servers. This is because the depot forwards every packet, irrespective of the states guessed at the depot, as long as a table entry is found. For example, a RST may be lost in the network between the depot and client but the entry is still maintained in the secondary table, which enables the forwarding of any retransmitted RST. In one embodiment, the forwarding from the depot to the servers is achieved by directing packets to physical ports of the device containing the depot function where each physical port connects to one server.

Figure 5:
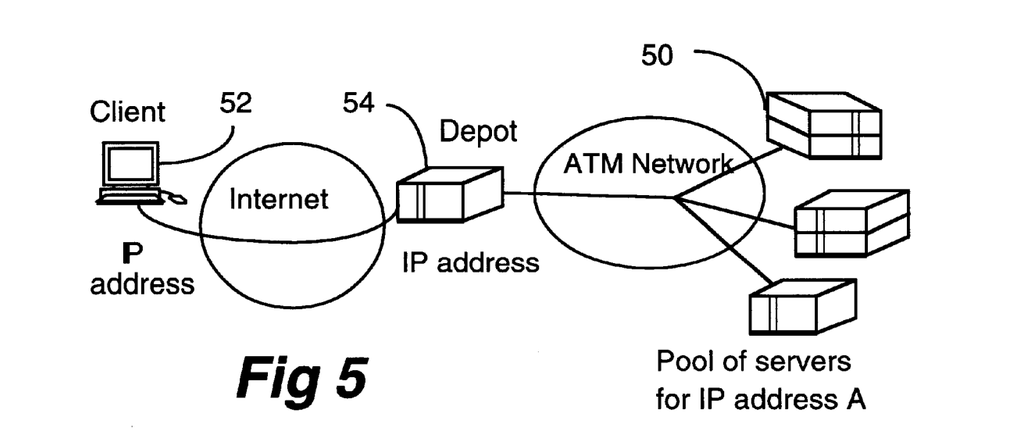
FIG. 5 is a schematic illustration of the invention as applied in the ATM environment according to one embodiment.

According to a further embodiment, the depot system of the invention is implemented in the ATM environment. In this embodiment, an ATM network is used as a transport mechanism to provide distributed WWW services. The network model is shown in FIG. 5. On the ATM network, multiple, information homogeneous, but potentially geographically distributed web servers 50 are provided. An Internet web client 52 can access information via the routes shown on the diagram. A depot 54 of the invention provides the interface between an Internet client and an ATM network server. An incoming packet from the client will be segmented and encapsulated into AAL5 cells at the depot without the requirement of modifying either the IP or TCP headers. The cells (packets) are carried sequentially in a virtual channel.

Figure 6:
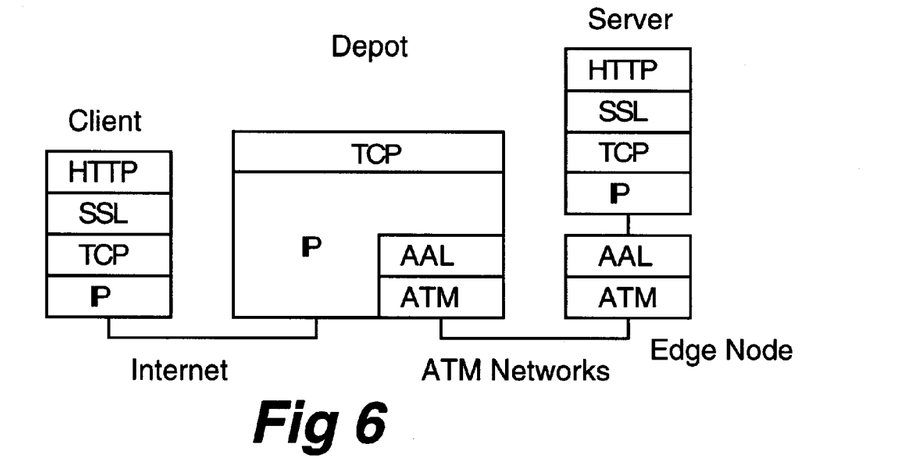
FIG. 6 shows protocol stacks of the architecture shown in FIG. 5.

Like the earlier embodiment, the depot ideally sits transparently between the clients accessing from the Internet and the servers on the ATM networks. The depot employs a TCP-based switching mechanism. It examines all TCP/IP packets and sends them to the ATM network from the Internet and vice versa. FIG. 6 shows the protocol stack structure of the system model. On the depot, there are TCP and IP stacks but the TCP session is only observed and not terminated.

Therefore, the depot of the embodiment performs the same functions as those described earlier. In addition, however, it must perform the following functions:
  transform IP packets to ATM cells and vice versa;
  map the QoS parameters from IP to ATM where applicable; and
  participate as necessary in the ATM network management.

Figure 7:
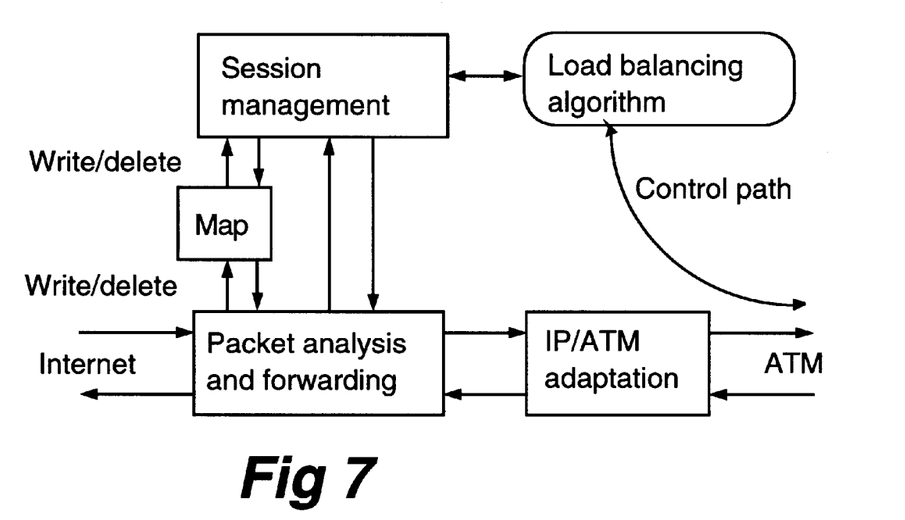
FIG. 7 is a functional block diagram of the embodiment shown in FIG. 5.

Similar to FIG. 4, FIG. 7 shows a functional block diagram of the depot of this embodiment. The depot identifies the flow (client IP and port) from the TCP/IP packets and maps the corresponding VPI/VCI in its table entries. At the IP/ATM adaptation block, the depot performs segmentation and encapsulation of packets into AAL5 cells without the requirement of modifying either the IP or TCP headers. Likewise, it also perform the reverse functions of ATM cells from the ATM network. For a new session, the packet analyzer identifies the TCP session setup request and forwards the information to the session management block. The next server to be allocated is selected, as described earlier. Packets are kept contiguous and are all sent over the same VC.

If the session is already allocated and recognized by the packet analyzer, it will read the correct VPI/VCI from its tables and forward the packet onward. Packets in the reverse direction are also analyzed in order to have a complete view of the state of the session.

In another embodiment, the forwarding is achieved by encapsulating the IP frames in a frame transport, such as Ethernet or Frame relay, using the addressing of that frame transport to identify individual servers.

In another embodiment, the forwarding is achieved by modifying the header information of the TCP/IP packet and redirecting it over an IP network.

Figure 8:
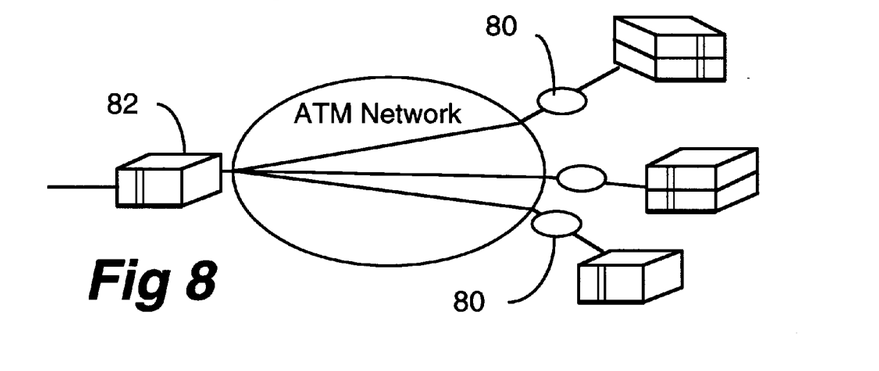
FIG. 8 is a schematic illustration of a yet another embodiment of the invention.

In FIG. 8, another embodiment is shown. According to this embodiment, servers may or may not be ATM-based hosts and therefore an edge node 80 is required as an access point to each server, which provides traffic management and any necessary IP/ATM conversion. FIG. 8 shows all the servers and Internet connections accessing the ATM network via edge nodes. The edge nodes communicate with each other over independent virtual circuits. Therefore, depot 82 is also an edge node managing the Internet connection that has the additional function of routing incoming packets to the correct server.

According to a yet further embodiment of the invention, the depot system of server management is applied to the proxy server architecture. Proxy servers are used to reduce the network load and latency by migrating the work load close to the clients.

A proxy server is an application gateway which operates at the HyperText Transfer Protocol (HTTP) layer. The basic function of a proxy server is almost identical to a HTTP server in transferring client requested documents. Furthermore, it is able to interpret and modify a HTTP request before forwarding it to the end WWW server. This is because the proxy server has the caching function. If there is a cache hit, it delivers the found documents to the client locally, thus reducing the network load and transmission latency.

Figure 9:
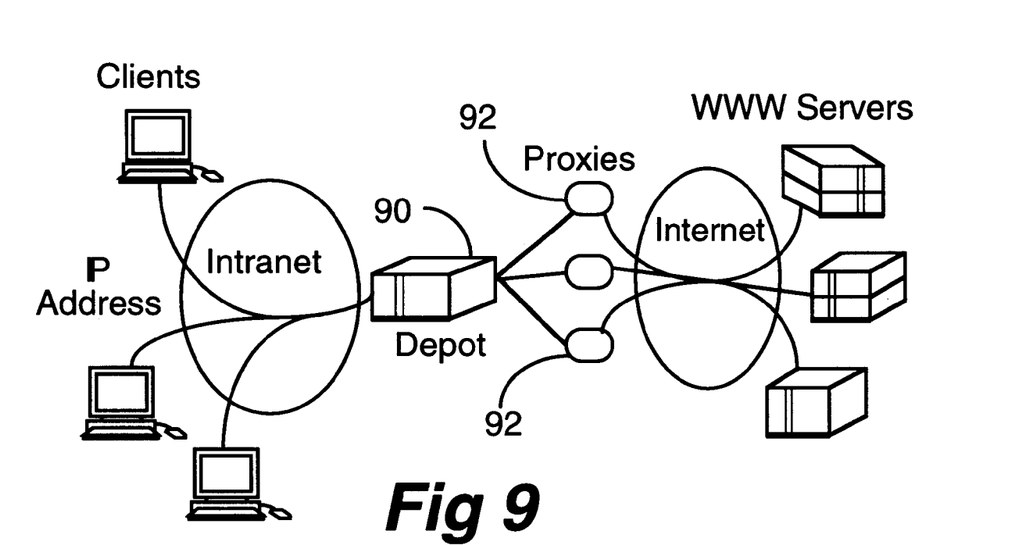
FIG. 9 shows schematically a yet further embodiment of the invention as applied in the proxy server environment.

FIG. 9 shows schematically the concept of another embodiment of the invention as applied to the proxy server management system. In FIG. 9, a depot proxy system is located between an intranet and the Internet. The depot distributes sessions among a pool of proxy servers based on load balancing or other criteria. The functions of the depot of the proxy system is identical to those described earlier. Therefore, for a new session, the packet analyzer identifies the TCP session setup request and forwards the information to the session management block. If the session is already allocated and recognized by the packet analyzer, it will read in the correct proxy identity from its tables and forward the packet onward. Packets in the reverse direction are also analyzed in order to have a complete view of the state of the session.

This proxy architecture can achieve the following similar goals:
1. scaleable proxy server arrangements;
2. high availability of information service; and
3. dynamic load balancing of traffic loads to different proxy servers.

To achieve scaleability, more proxy servers can be attached to the depot. This is because the depot handles only simple functions. When a depot operates to its limitations, it is also possible to add a new depot with a new IP address under the same alias name. With the newly added depot, another cluster of proxy servers can be created on the network.

EXPERIMENTAL RESULTS

A Pentium PC running a NetBSD operating system is used for the software implementation of the depot. The client's HTTP requests are generated using benchmark software from Zeus Corporation. The clients and servers are connected to the depot using 10 Mbps Ethernet. The same test file is retrieved 1000 times for each test. The number of simultaneous HTTP requests are varied to study the depot behaviour. Traffic is forwarded by the depot to two identical NCSA/1.5.1 Web servers in a round robin fashion. Server throughput (total bytes tranferred per second) is measured for each test case. The total number of bytes of data and the HTTP headers divided by the time taken to transfer indicates the server throughput. The number of HTTP requests served by the server per second is also measured. Both measures include a variable network delay. To minimise the variable network delay, the experiment is performed at a time when the network is very lightly loaded. The variation of the server throughput and HTTP requests served per second with an increased rate of client requests are good indicators of server performance.

TABLE 1

| Con-current sessions | file size: 100 bytes | | file size: 1 Kbytes | | file size: 10 Kbytes | |
|---|---|---|---|---|---|---|
| | single server | invention | single server | invention | single server | invention |
| 1 | 18.22 | 17.46 | 66.58 | 56.67 | 52.13 | 51.98 |
| 5 | 29.21 | 44.62 | 99.26 | 80.75 | 151.85 | 168.18 |
| 10 | 21.1 | 55.13 | 94.83 | 99.81 | 226.80 | 244.53 |
| 15 | 10.18 | 39.5 | 65.75 | 101.73 | 223.1 | 277.06 |
| 20 | 11.17 | 29.86 | 42.64 | 111.93 | 251.24 | 289.91 |
| 25 | 6.46 | 30.00 | 33.86 | 117.53 | 233.73 | 297.89 |
| 100 | 6.55 | 12.23 | X | 37.59 | X | 282.81 |

TABLE 2

| Con-current sessions | file size: 100 bytes | | file size: 1 Kbytes | | file size: 10 Kbytes | |
|---|---|---|---|---|---|---|
| | single server | invention | single server | invention | single server | invention |
| 1 | 64.61 | 61.92 | 55.16 | 46.95 | 5.00 | 4.99 |
| 5 | 103.48 | 158.23 | 82.19 | 66.88 | 14.55 | 16.13 |
| 10 | 74.59 | 194.70 | 78.31 | 82.55 | 21.68 | 23.44 |
| 15 | 35.73 | 138.95 | 54.03 | 84.21 | 21.35 | 26.53 |
| 20 | 39.03 | 104.62 | 34.87 | 92.29 | 23.97 | 27.67 |
| 25 | 22.48 | 105.22 | 27.55 | 97.23 | 22.40 | 28.49 |
| 100 | 22.41 | 40.79 | X | 28.51 | X | 25.69 |

Table 1 shows the server throughput in Kbytes/sec. The experiment is performed with three different file sizes: 100 bytes, 1 Kbyte and 10 Kbytes. The number of simultaneous client HTTP requests are varied from 1 to 100. The total number of client HTTP requests for each test is 1000. The experiment is performed with a single server system and a depot system with two servers. Table 2 shows the number of served HTTP requests per second under the same experimental setup.

For one client HTTP request (any file size) at a time, the depot system is always slower than the single server. This is due to the store and forward delay introduced at the depot. For multiple simultaneous HTTP requests, however, the HTTP requests are served in parallel by two servers. In general, the depot system shows improved throughput and served HTTP requests per second. Another reason for performance improvement is the reduced workload at each server due to the distribution of HTTP requests. For 100 bytes and 1 Kbyte files, the single server performance degrades quickly with the increased number of simultaneous sessions. Performance with the depot system is consistently better than the single server system. For the 10 Kbytes file, the single server performance remains flat. However, the performance with the depot system is better than the single server system.

For 100 simultaneous HTTP requests, the single server system could complete the test for only a 100 bytes file size. The depot system could complete the tests for all three file sizes.

It is found that the throughput and HTTP requests served per second with the depot system are more than double those of the single server system with a large number of simultaneous sessions. For example, the number of HTTP requests served per second for the test case of 1 Kbyte file size with 20 simultaneous sessions is 92.29. This is an improvement of 2.65 over the single server system. This linear improvement is due to the halved number of simultaneous sessions (i.e., 10) on each server. The number of HTTP requests served per second by the single server system with 10 simultaneous HTTP requests is 78.31. Thus, maximum served requests of (2*78.31) 156.62 is theoretically attainable.

Thus it is shown that the server throughput and serviced requests per second can be improved using multiple servers according to the invention.

In the multiple server system, if one server goes down, the depot transfers all subsequent sessions to the other servers in the same cluster. There are several methods to detect server failure. A depot may assume the failure of a server if it does not receive an ACK from the server for several seconds after it sends a message to the server. After that, the depot starts polling the failed server on a regular basis to check if the server program has restarted. Another method that the depot uses is the passive reception of server statistics as an indication of the operability of a server program. If the depot does not receive any information for a period of time, then the depot will put this server into a dead-list and new incoming TCP requests will not be routed to this server. When server statistics are received from this server again, the depot will then put it back into an alive-list. However, there is difficulty in identifying the current state within each TCP session such as the number of bytes sent, the current window size and sequence number etc. Thus, the lost TCP sessions from a faulty server are simply scrapped.

The depot reliability is also very important since all the traffic is concentrated at the depot. Standby sparing is a simple method of providing fault tolerance in the system. There can be hot or warm standby. A sparing standby depot machine is always in alert mode to assume normal depot operations upon detecting a failure in the operating depot. For hot standby, the replica actively monitors all input streams from both the client and server. Both operating machine and replica have virtually identical TCP state information about all sessions. Detection of depot failure initiates changeover of control.

For warm standby, the operating machine periodically sends the state information to the replica to update the standby's database. In this situation, the two databases shall not be the same most of the time, but the goal is to reduce the number of affected TCP sessions when failure occurs. Then the standby replica will automatically be activated on fault detection.

What is claimed is:

1. In a client-server environment of a telecommunications network, where information resources, which are accessed by HTTP protocol, are replicated among a plurality of servers and a client has access to any one or more of the servers for desired information resources, a method of efficiently utilizing the plurality of servers comprising steps of:

performing an HTTP transaction by HTTP protocol between the client and the plurality of servers, the HTTP transaction comprising one or more TCP connection sessions which are conducted by way of a depot;

storing, at the depot, information about the TCP connection sessions and parameters in a primary and a secondary map, the information in the primary map being deleted at the close of sessions and the information at the secondary table being maintained for two maximum segment lifetimes (MSL);

transparently forwarding TCP connection sessions of the HTTP transaction at the depot in both directions to and from the client and the plurality of servers;

monitoring parameters indicative of either or both of load and operability of the servers;

detecting transition states of the TCP connection sessions of the HTTP transaction at the depot; and switching at the depot the plurality of TCP connection sessions of the HTTP transaction among the plurality of servers based on the detected transition states and the monitored parameters of the servers so that during the HTTP transaction, transfer of the information resources is performed by HTTP protocol between the client and one or more servers among the plurality of servers.

2. The method according to claim 1 wherein there are a plurality of depots, comprising further steps of:

monitoring parameters indicative of operability of all the depots; and upon detection of inoperability of one depot, continuing all the functions of the failed depot at any of the remaining depots.

3. The method according to claim 1 wherein the depot is connected to one or more servers through an ATM network, comprising a further step of:

performing the TCP connection sessions in ATM cells through the ATM network.

4. The method according to claim 3 wherein there are a plurality of depots, comprising further steps of:

monitoring parameters indicative of operability of all the depots; and upon detection of inoperability of one depot, continuing all the functions of the failed depot at any of the remaining depots.

5. The method according to claim 1 wherein the depot is connected to one or more servers through a local area network or a frame relay network, comprising further steps of:

performing the TCP connection sessions in their appropriate format through the local area network or the frame relay network.

6. The method according to claim 5 wherein there are a plurality of depots, comprising further steps of:

monitoring parameters indicative of operability of all the depots; and upon detection of inoperability of one depot, continuing all the functions of the failed depot at any of the remaining depots.

7. The method according to claim 1, wherein the depot is connected to one or more servers by way of a plurality of proxy servers, comprising further steps of:

switching at the depot the TCP connection sessions among the proxy servers which in turn send the HTTP transaction to the servers; and cacheing information resources contained in the the HTTP transaction at the proxy servers.

8. The method according to claim 7, comprising further steps of:

monitoring the status of all the proxy servers; and for each TCP connection session, selecting one proxy server among all the proxy servers based on their monitored status.

9. The method according to claim 8 wherein there are a plurality of depots, comprising further steps of:

monitoring parameters indicative of operability of all the depots; and upon detection of inoperability of one depot, continuing all the functions of the failed depot at any of the remaining depots.

10. In a client-server environment of a telecommunications network, where information resources, which are accessed by HTTP protocol, are replicated among a plurality of servers and a plurality of clients have access to any one or more of the servers for desired information resources through a plurality of HTTP transactions, each HTTP transaction using multiple TCP connection sessions, a method of efficiently utilizing the plurality of servers during the HTTP transactions, comprising steps of:

performing each HTTP transaction on HTTP protocol between any one of the plurality of clients and the plurality of servers, each HTTP transaction comprising one or more TCP connection sessions which are conducted on TCP/IP through a depot; and at the depot, performing the following steps:

storing information about the TCP connection sessions and parameters in a primary and a secondary map, the information in the primary map being deleted at the close of sessions and the information at the secondary table being maintained for two maximum segment lifetimes (MSL);

inspecting all TCP/IP packets to detect a state transition of the TCP connection sessions;

transparently forwarding TCP/IP packets of existing TCP connection sessions to a correct server;

detecting TCP/IP packets of a new TCP connection session;

monitoring parameters indicative of either one or both of load and operability of the servers;

selecting a server among the plurality of servers based on their monitored parameters and the state transition; and transparently forwarding all the TCP/IP packets of the new TCP connection session to the selected server so that during each of the existing and new TCP connection sessions, transfer of the information resources of the HTTP transactions is performed between any one of the clients and one or more servers by one or more new and existing TCP connection sessions.

11. The method according to claim 10 wherein there are a plurality of depots, comprising further steps of:

monitoring parameters indicative of the operability of all the depots; and upon detection of inoperability of one depot, continuing all the functions of the failed depot at any of the remaining depots.

12. The method according to claim 10 wherein the depot is connected to one or more servers through an ATM network, comprising a further step of:

performing the TCP connection sessions in ATM cells through the ATM network.

13. The method according to claim 12 wherein there are a plurality of depots, comprising further steps of:

monitoring parameters indicative of the operability of all the depots; and upon detection of inoperability of one depot, continuing all the functions of the failed depot at any of the remaining depots.

14. The method according to claim 10 wherein the depot is connected to one or more servers through a local area network or a frame relay network, comprising further steps of:

performing the TCP connection sessions in their appropriate format through the local area network or the frame relay network.

15. The method according to claim 10, wherein the depot is connected to one or more servers by way of a plurality of proxy servers, comprising further steps of:

switching, at the depot, the TCP connection sessions among the proxy servers which in turn send TCP connection sessions to the server; and cacheing information resources contained in the TCP connection sessions at the proxy servers.

16. The method according to claim 15, comprising further steps of:

monitoring the status of all the proxy servers; and for each TCP connection session, selecting one proxy server among all the proxy servers based on their monitored status.

17. The method according to claim 16 wherein there are plurality of depots, comprising further steps of:

monitoring parameters indicative of the operability of all the depots; and upon detection of inoperability of one depot, continuing all the functions of the failed depot at any of the remaining depots.

18. In a client-server environment of a telecommunications network, where information resources are replicated among a plurality of servers and a plurality of clients have access to any one or more of the servers for desired information resources through an HTTP transaction using at least two layers of protocols, one stateless protocol layer upon another stateful protocol layer, the HTTP transaction running on the stateless protocol layer of HTTP protocol and being made up of one or more TCP connection sessions which run on TCP/IP layer, a depot for transferring one or more TCP connection sessions between a client and among a plurality of servers, comprising:

a primary and a secondary map for storing information about the TCP connection sessions and parameters, the information at the primary map being deleted at the close of sessions and the information at the secondary map being maintained for two maximum segment lifetimes (MSL);

a packet analysis block for analysing and transparently forwarding TCP/IP packets of one or more TCP connection sessions of the HTTP transaction between the client and one of the servers;

a session management block for switching one or more TCP connection sessions of the HTTP transaction among the plurality of servers according to a preset criteria including the TCP/IP states of each TCP connection session; and a protocol state tracking block for monitoring the TCP/IP states of the TCP connection sessions of the HTTP transaction.

19. The depot according to claim 18, further comprising:

a map which contains data concerning either one or both of load and operability of the plurality of servers; and the session management block for switching one or more TCP connection sessions of the HTTP transaction among the servers based on the data storedd in the map.

20. The method according to claim 14 wherein there are a plurality of depots, comprising further steps of:

monitoring parameters indicative of the operability of all the depots; and upon detection of inoperability of one depot, continuing all the functions of the failed depot at any of the remaining depots.

* * * * *